United States Patent [19]

Shibata et al.

[11] Patent Number: 4,556,915

[45] Date of Patent: Dec. 3, 1985

[54] IMAGE REPRODUCTION DEVICE

[75] Inventors: Takehiko Shibata, Kokubunji; Yoshikazu Yokomizo, Kawagoe, both of Japan

[73] Assignee: Canon Kabushiki Kaisha, Tokyo, Japan

[21] Appl. No.: 636,237

[22] Filed: Jul. 31, 1984

Related U.S. Application Data

[63] Continuation of Ser. No. 350,607, Feb. 22, 1982, abandoned.

[30] Foreign Application Priority Data

Mar. 5, 1981 [JP] Japan .................................. 56-30468

[51] Int. Cl.[4] ............................................ H04N 1/40
[52] U.S. Cl. .................................. 358/280; 258/282; 382/44
[58] Field of Search ............... 358/282, 293, 280, 294; 382/9, 44, 47

[56] References Cited

U.S. PATENT DOCUMENTS 4,257,070  3/1981  Sommer et al. ...................... 358/282
4,327,380  4/1982  Yamada et al. ...................... 358/287

Primary Examiner—John C. Martin
Assistant Examiner—Edward L. Coles
Attorney, Agent, or Firm—Fitzpatrick, Cella, Harper & Scinto

[57] ABSTRACT

This invention provides an image reproduction device having a horizontal coordinate memory, a vertical coordinate memory and a domain code memory which comprise respectively a RAM, horizontal and vertical counters, horizontal and vertical coordinate comparators, an addressable latch for the horizontal coordinate comparator and an addressable latch for the vertical coordinate comparator, gate circuits and an A/D converter. The image reproduction device prevents recording in black of a portion surrounding the original when the size of a recording medium is larger than that of the original, thus preventing poor appearance of the image reproduced on recording medium.

11 Claims, 5 Drawing Figures

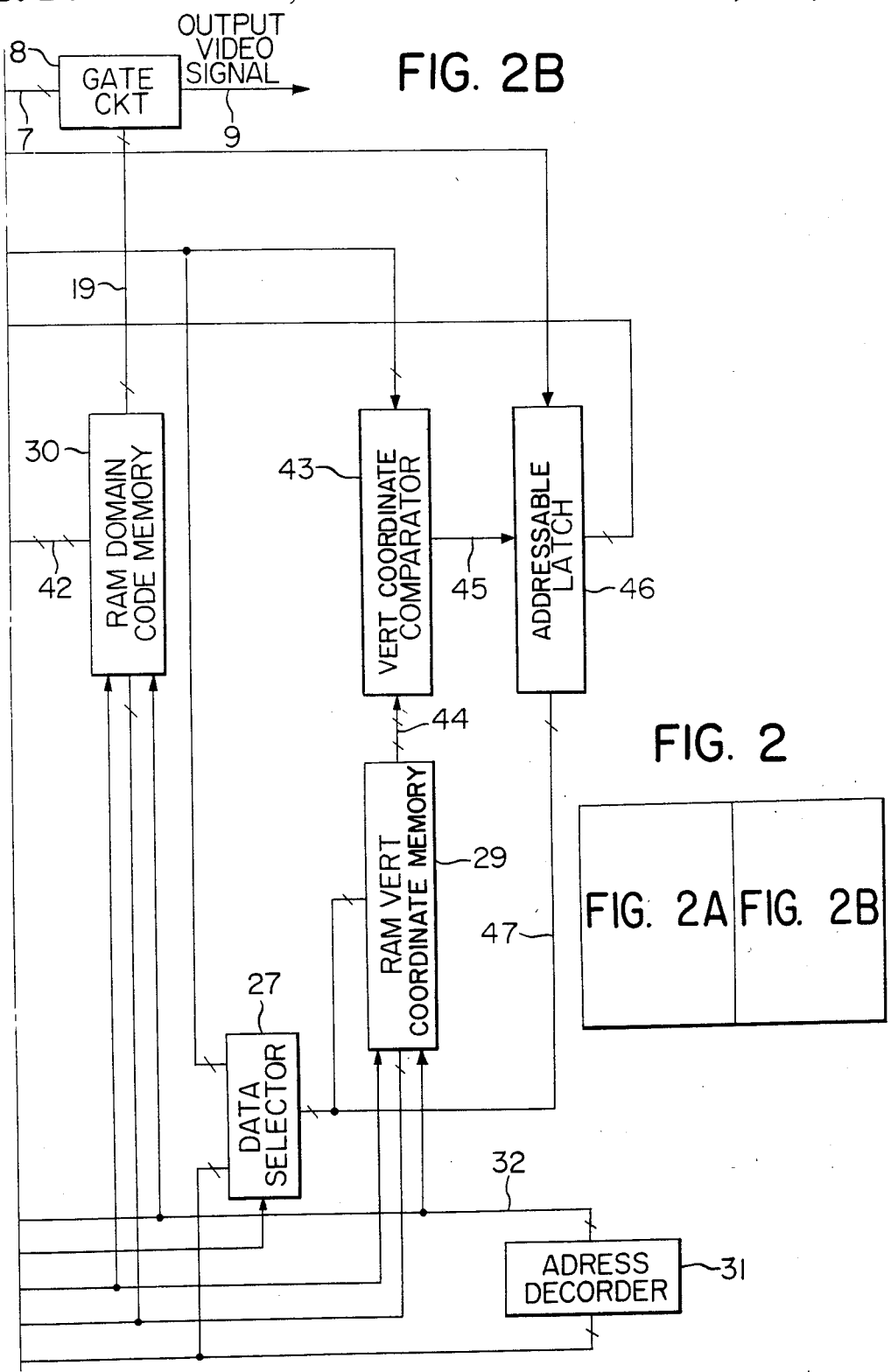

IMAGE REPRODUCTION DEVICE

This application is a continuation of application Ser. No. 350,607 filed Feb. 22, 1982, now abandoned.

BACKGROUND OF THE INVENTION

1. Field of the Invention

The present invention relates to an image reproduction device and, more particularly, to an image reproduction device for electrically reading the density of an original so as to obtain a video signal and for reproducing an image of the original in response to the video signal.

2. Description of the Prior Art

An image reproduction method is conventionally known wherein the density of an original is electrically read by a solid-state image pickup element such as CCD in an image reproduction device and a copy image of the original is reproduced on a recording medium such as a paper sheet with a recording device such as a laser beam printer, an ink jet printer or the like which processes a signal from the CCD. The image reproduction method of this type is used for a facsimile, a copying machine and the like. Assume that an original of B5 size is copied on a copying sheet of A4 size. When copying is performed with the cover of the original table open or even if the cover is closed when copying a thick original such as a book, the portion surrounding the original of B5 size is conventionally recorded in black. Thus, the copy quality is degraded and the recorded copying sheet has a poor appearance. Further, developer is wasted, resulting in a lack of economy.

SUMMARY OF THE INVENTION

The present invention has been made in consideration of the above problems and it is an object of the present invention to provide an image reproduction device which is capable of recording an image of good quality.

It is another object of the present invention to provide an image reproduction device which is capable of erasing an unnecessary portion of an original image to perform proper recording.

It is still another object of the present invention to provide an image reproduction device for eliminating a portion except for the original to perform proper recording when the size of a recording medium is larger than that of the original.

The above and other objects of the present invention will become apparent from the following detailed description when taken in conjunction with the accompanying drawings.

DETAILED DESCRIPTION OF THE PREFERRED EMBODIMENT

Figure 1:
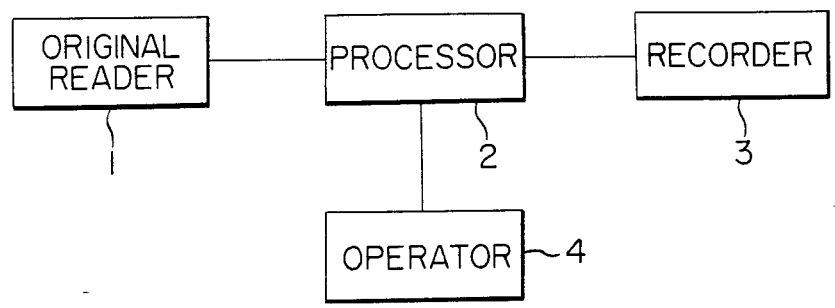
FIG. 1 is a block diagram of an image reproduction device according to one embodiment of the present invention.

FIG. 1 is a block diagram of an image reproduction device according to one embodiment of the present invention.

An original reader 1 electrically reads the density of an original set at a predetermined position by a solid-state image pickup element CCD which comprises a plurality of light-receiving elements aligned in one direction and generates a video signal. A processor 2 processes the video signal so as to perform operation such as image domain selection processing, erase processing and halftone reproduction processing. A recorder 3 which, for example, comprises a laser beam printer or an ink jet printer, forms an image on the recording medium in response to the video signal from the processor 2. An operator section 4 is used for entering an image processing instruction by the user.

In the image reproduction device of the above configuration, image processing of the original is arbitrarily performed and an image is reproduced on the recording medium.

Figure 2A:
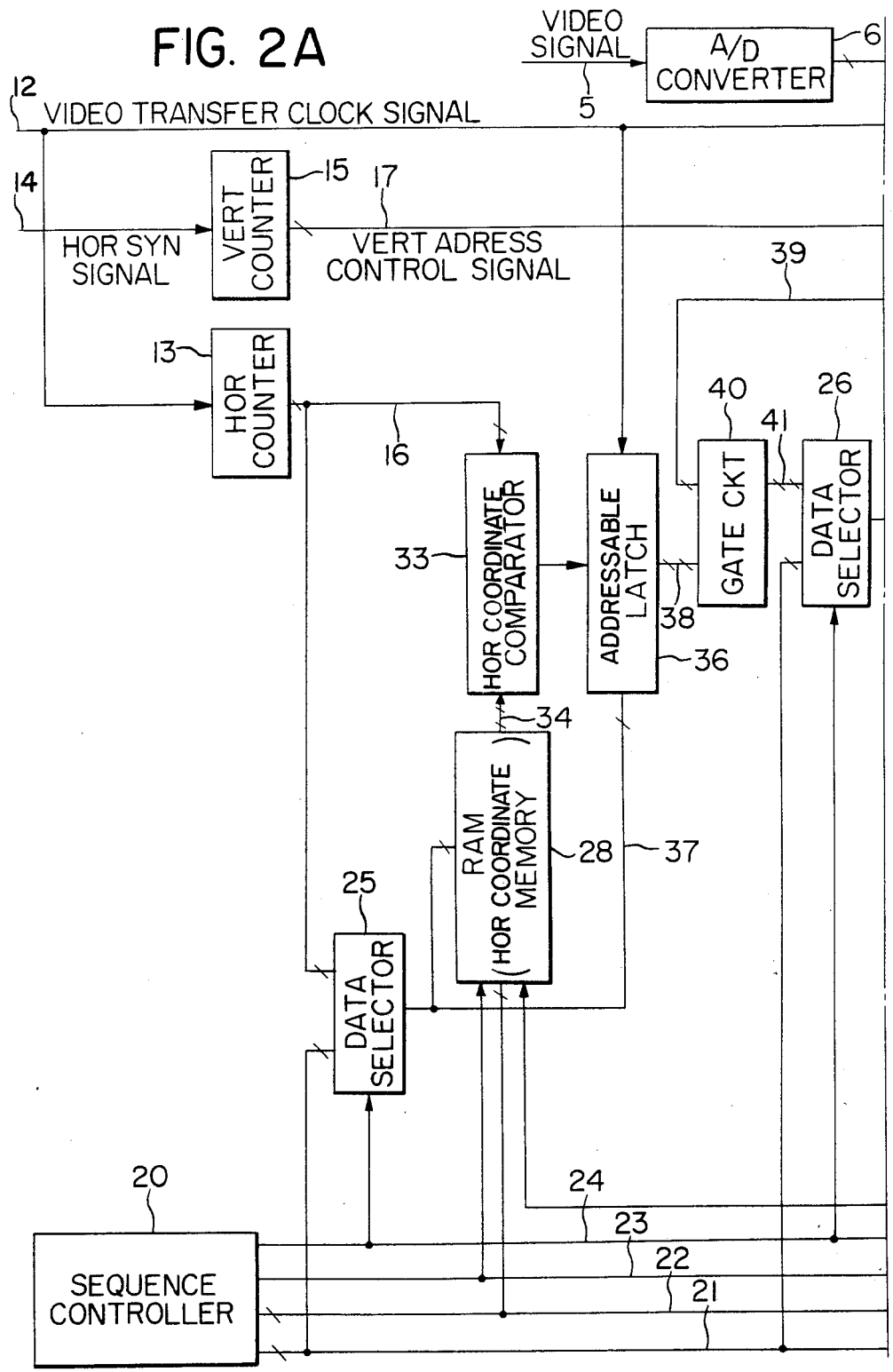
FIGS. 2 A & B are a block diagram of a processor for designating a domain according to the image reproduction device of one embodiment of the present invention.

FIG. 2 is a block diagram of the processor 2 of the image reproduction device of FIG. 1 according to one embodiment of the present invention. The video signal representing the density of the original is read out in response to a video transfer clock signal supplied from the original reader 1 which includes a one-dimensional solid-state image pickup element. This video signal is supplied to an A/D converter 6 through a video signal input terminal 5. The A/D converter 6 converts the video signal to a digital signal which is, in turn, supplied as a quantized digital signal to a digital video signal line 7. This digital video signal is input to a gate circuit 8. The gate circuit 8 selects the digital video signal or a predetermined signal. The selected signal is then generated at a video signal output terminal 9 in accordance with the control of a domain code memory 30 to be described later. The video signal output terminal 9 is connected to a recording head of the recorder 3. The recording head digitally reproduces an image on the recording medium in response to the binary coded signal. When a domain except for a specified domain is to be recorded as a white image, the video signal generated from the video signal output terminal 9 must be converted to a video signal corresponding to the white image in the gate circuit 8. Alternatively, for this purpose, a binary coded signal $(1111)_2$ which is larger than the maximum value of a signal corresponding to a black image must be written in a halftone dither matrix ROM (read-only memory). A case will hereinafter be described wherein the video signal is converted to the signal correspoinding to the white image.

According to this former method, a horizontal sync signal 14 is generated in response to a horizontal scanning signal supplied from the original reader 1. The horizontal sync signal is counted in a vertical counter 15 for counting vertical addresses. The vertical counter 15 outputs a count value corresponding to the vertical direction, that is, the subscanning direction of the CCD, to a vertical address signal line 17. This value is supplied to a vertical coordinate comparator 43. A video transfer clock signal 12 is supplied to a horizontal counter 13 for counting horizontal addresses. The video transfer signal 12 is generated in response to the horizontal scanning signal supplied from the original reader 1, that is, the main scanning signal from the original reader 1. The video transfer clock signal 12 is counted in the horizontal counter 13 and the count value determines the horizontal position of the image. The signal from the horizontal counter 13 is supplied to a horizontal coordinate comparator 33 for detecting the horizontal coordinate.

A sequence controller 20 has a known microcomputer. The microcomputer is of the type in which bus lines are directly connected to address and data buses of the sequence controller 20. An address bus (AB) 21 is connected to an address decoder 31, and data selectors 25, 26 and 27. A data bus (DB) 22 is connected to a RAM (random access memory) 28 which serves as the horizontal coordinate memory, a RAM 29 which serves as the vertical coordinate memory, and a RAM 30 which serves as the domain code memory. A read/write (R/W) control line 23 is connected to the RAMs 28, 29 and 30. A direct memory access (DMA) control line 24 is connected to the data selectors 25, 26 and 27 through an output port with a latch function. The address bus (AB) 21, the data bus (DB) 22, the read/write (R/W) control line 23 and the direct memory access (DMA) control line 24 are used for controlling the RAMs 28, 29 and 30. As described above, the RAMs 28, 29 and 30 are, respectively, called the horizontal coordinate memory, the vertical coordinate memory and the domain code memory.

Input data lines for the RAMs 28, 29 and 30 are connected to the data bus (DB) 22, as described above, and are independent of output data lines 34, 44, 19 thereof, respectively. The RAMs 28, 29 and 30 are independently and selectively controlled by a memory selection control line 32 which is connected to the address decoder 31. Thus, the RAMs 28, 29 and 30 are maintained in the write enabling mode. On the other hand, when the DMA control line 24 is used in the DMA mode, the RAMs 28, 29 and 30 are simultaneously controlled by a common control line (not shown), so that the RAMs 28, 29 and 30 are maintained in the read enabling mode.

When the DMA control line 24 is in the DMA mode, the data selectors 25, 26 and 27 select an address from the horizontal counter 13, a gate circuit 40 and the vertical counter 15, respectively. On the other hand, when the DMA control line 24 is not in the DMA mode, the data selectors 25, 26 and 27 are connected to the address bus 21 of the sequence controller 20. Thus, domain designation data is supplied to the data selectors 25, 26 and 27 and the address control is performed by the sequence controller 20. Output lines 37, 42 and 47 are, respectively, connected to the data selectors 25, 26 and 27 and are called the horizontal address control line, the domain selection memory address control line and the vertical address control line. These control lines 37, 42 and 47 comprise 2 bits, respectively, and are sequentially assigned in 2 bits from the LSB (least significant bit) of the address bus 21. The address decoder 31 decodes upper significant bits of the address bus 21. With the above configuration, addresses of the RAMs 28, 29 and 30 can be freely accessed without distinguishing them from the internal memory of the sequence controller 20 which is allocated to part of the memory address space in the microcomputer.

Figure 3:
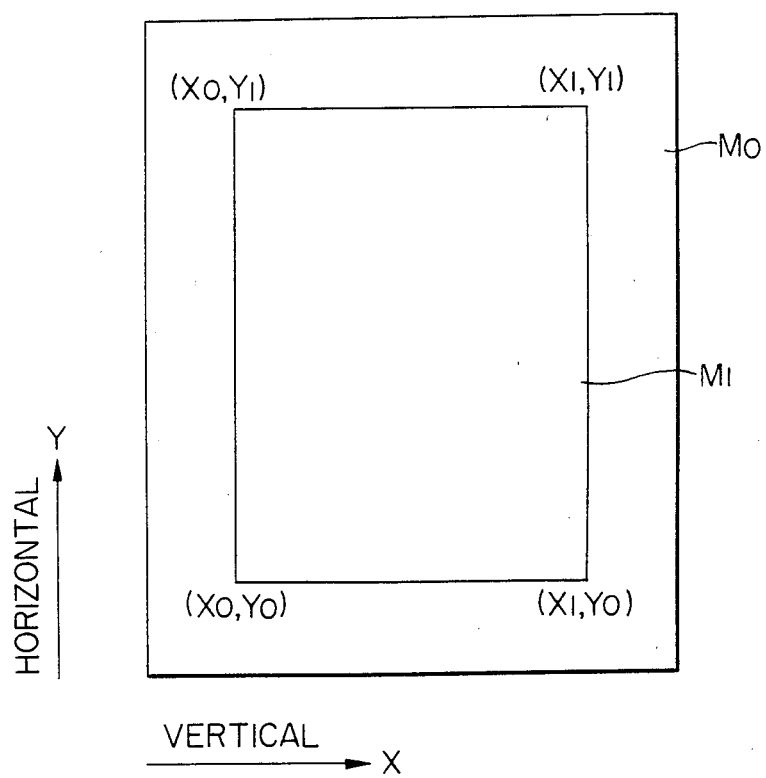
FIG. 3 is a view for explaining domain designation.

Domain designation data shown in FIG. 3 is stored in the RAMs 28, 29 and 30. Referring to FIG. 3, a domain designation format is shown, in which Y denotes a point plotted on the horizontal axis (abscissa) of the coordinates, X denotes a point plotted on the vertical axis (ordinate) of the coordinates, and M denotes a domain code number. The outer frame corresponds to the size of the original (e.g., A4 size), as far as the addresses thereof are concerned. As a whole, the outer frame corresponds to domain code number M0 and the inner frame corresponds to domain code number M1. In a domain corresponding to domain code number M1, points Y0 and Y1 are plotted on the horizontal axis and points X0 and X1 are plotted on the vertical axis.

With this domain designation instruction, data for points Y0 and Y1 on the horizontal axis is stored in the horizontal coordinate memory 28 of FIG. 2 to be described in detail later. On the other hand, data for points X0 and X1 is stored in the vertical coordinate memory 29. Data for domain code numbers M0 and M1 is stored in the domain code memory 30.

The horizontal coordinate comparator 33 compares a signal from the output data line 34 of the horizontal coordinate memory 28 with a signal as the count value supplied from the horizontal counter 13 through a horizontal address control line 16. If these signals coincide, an output from the horizontal coordinate comparator 33 to a line 35 is changed. Data of point Yn on the horizontal axis numbers two, so that the horizontal coordinate comparator 33 requires two channels. However, the horizontal coordinate comparator 33 with the time division system only requires one channel. An addressable latch 36 is used for this purpose. An address of the addressable latch 36 is accessed by an address signal corresponding to a point (on the horizontal axis) data of which is supplied to the horizontal address control lines 37. Further, the data is latched in the addressable latch 36 in response to the video transfer clock signal 12. An output from the addressable latch 36 is called the domain horizontal selection signal and is output through domain horizontal selection lines 38 when the video signal corresponding to a point between specified points Y0 and Y1 on the horizontal axis is input. The horizontal address control lines 37 number two, as shown in FIG. 2. Therefore, signals from the two horizontal address control lines 37 are decoded in the addressable latch 36 in accordance with binary decoding. In other words, the domain horizontal selection lines 38 also number two and correspond to data of points Y0 and Y1 on the horizontal axis.

The domain horizontal selection lines 38 can only specify the horizontal direction of domain code number M1 corresponding to the inner frame as shown in FIG. 3. Therefore, in order to specify the domain in the vertical direction, the vertical coordinate comparator 43 is disposed. The vertical coordinate comparator 43 compares the vertical address control signal which corresponds to a position in the vertical direction and which is supplied from the vertical counter 15 with the signal from the vertical coordinate memory 29. When these signals coincide, a signal on a signal line 45 is changed. An addressable latch 46 an address of which is accessed by a signal through the vertical address control lines 47 latches data in response to the video transfer clock signal 12. An output from the addressable latch 46 is generated from a domain vertical selection line 39 and supplied to the gate circuit 40. The signal from the domain vertical selection line 39 is supplied when the video signal corresponding to a point between two specified points X0 and X1 on the vertical axis is output (read).

As shown in FIG. 2, the vertical address control lines 47 number two. Therefore, signals from the two vertical address control lines 47 are decoded in the addressable latch 46. In other words, the domain vertical selection lines 39 number two and correspond to data of points X0 and X1 on the vertical axis.

In this manner, the logical AND between a signal from the domain horizontal selection line 38 and a signal from the domain vertical selection line 39 is produced by the gate circuit 40. Thus, the domain selection in the horizontal and vertical directions can be performed. Thus, an output generated from the gate circuit 40 through a domain selection line 41 is the domain selection signal by which points in the horizontal and vertical directions, that is, desired coordinates are determined. While the signal is being generated from the domain horizontal selection line 38 and the signal is simultaneously being generated from the domain vertical selection line 39, the video signal to be supplied to the gate circuit 8 is judged to have been read within the range of the specified domain, that is, within the inner frame.

When the DMA mode is not initialized, the data selector 26 selects address data from the sequence controller 20. On the other hand, in the DMA mode, the data selector 26 selects the signal from the domain selection line 41. An output from the data selector 26 at this time is called the domain selection memory address control signal and is output from domain selection memory address control lines 42. The domain selection memory address control lines 42 number two in the figure and select domain code number M0 or M1 stored in advance. A signal for the domain code number is generated from a domain switching control line 19. The signal from the domain switching control line 19 is supplied to the gate circuit 8. The gate circuit 8 supplies the video signal to the predetermined domain through the video signal output terminal 9 in accordance with the selected domain code number. On the other hand, the gate circuit 8 supplies to the video signal output terminal 9 a signal corresponding to a specified value for other domains.

Figure 4:
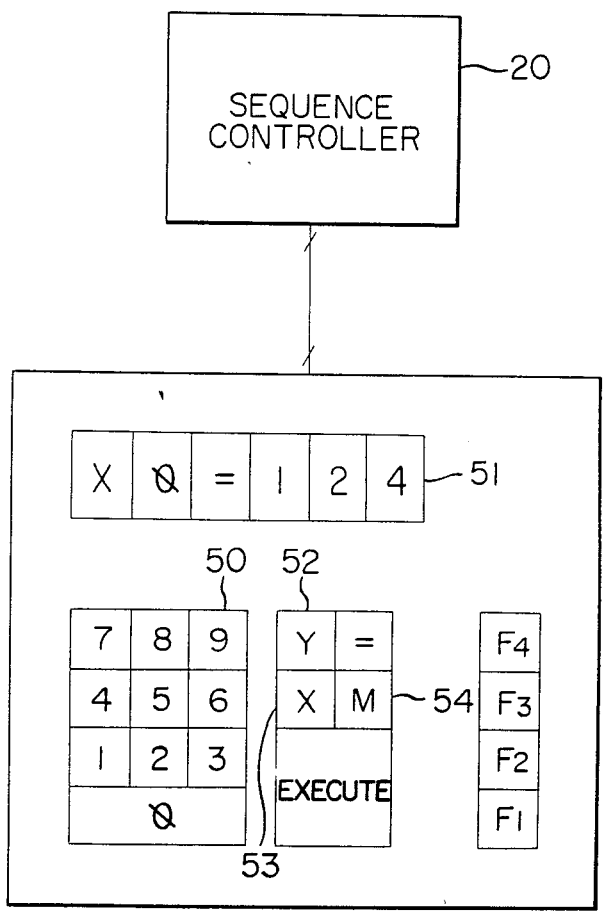
FIG. 4 is an input device for designating the domain.

In the image reproduction device with the above configuration, data for the coordinates (X0, Y0) and (X1, Y1) is input to the sequence controller 20 in order to designate the domain. The data is entered by key switches arranged in the operation section 4 as shown in FIG. 4. The user enters data for a distance (e.g., a predetermined position on the original table) from the origin in units of mm by ten keys 50 of the key switches. For example, when a distance from the origin to point X0 is to be 124 mm, the "X", "0", "=", "1", "2", "4" and "EXECUTE" keys must sequentially depressed. The input data is then displayed as X0=124 at a display 51, as shown in FIG. 4. In the same manner, data for point Y and domain code number M is entered by input keys 52 to 54. The sequence controller 20 generates a signal in accordance with the input data. This signal is stored in the RAMs 28, 29 and 30.

The values in units of mm entered by the key switches are converted to the video transfer clock signal of the CCD and the horizontal sync signal and stored in the RAMs 28 and 29.

The video signal sequentially read by the CCD is supplied to the video signal input terminal 5 in accordance with the scanning operation of the original reader 1. This video signal is supplied to the A/D converter 6 and the video signal is converted to the digital signal. This digital signal is then supplied to the gate circuit 8. Further, the video signal is read at a predetermined point which is determined by the horizontal counter 13 and the vertical counter 15. The specific coordinates are compared with data stored in the horizontal coordinate memory 28 and the vertical coordinate memory 29 by the horizontal coordinate comparator 33 and the vertical coordinate comparator 43, respectively. When the point for reading the video signal which corresponds to certain coordinates coincides with the predetermined coordinates, the horizontal coordinate comparator 33 and the vertical coordinate comparator 43 supply an output to the output lines 35 and 45, respectively. The outputs which indicate the coincidence of the point for reading the video signal and the predetermined coordinates are addressed by the address control lines 37 and 47. These outputs are then latched in the addressable latches 36 and 46 in response to the video transfer clock signal 12. In the DMA mode, that is, when the video signal is being read, address data from the horizontal and vertical counters 13 and 15 is supplied to the address control lines 37 and 47. On the other hand, when the DMA mode is not initialized, address data (domain designation data) is supplied from the sequence controller 20 to the address control lines 37 and 47.

In this manner, the horizontal coordinate data is accessed by the addressable latch 36 and the vertical coordinate data is accessed by the addressable latch 46. The domain designation in the horizontal and vertical directions is completed by the operation of the gate circuit 40.

In the DMA mode, the data selector 26 selects the selection line 41 of the gate circuit 40. Domain code number M0 or M1 is selected by the domain selection memory address control line 42. A signal is then output to the domain switching control line 19 in accordance with the selected domain code number. For example, in a domain for domain code number M0, the video signal supplied to the gate circuit 9 is converted to a video signal corresponding to a white image and is output therefrom. In a domain inside the inner frame for domain code number M1, the video signal supplied to the gate circuit 9 is output to the video signal output line 9.

Thus, the domain outside the inner frame is recorded white, and gradation can be properly reproduced in the domain surrounded by the inner frame by the binary coded signal corresponding to a halftone image.

As described above, the domain selection can be simply performed by rewriting data in the horizontal and vertical coordinate memories allocated to the RAM areas of the microcomputer in the sequence controller 20. On the other hand, the domain inside the inner frame is recorded as a white image and the domain outside the inner frame is recorded as a halftone image by rewriting data in the domain code memory 30. In accordance with the present invention, practical domain designation of high quality can be easily performed.

Alternatively, the gate circuit 8 may comprise a magnitide comparator. The video signal to be supplied to the gate circuit 8 is compared with a predetermined threshold value, in accordance with a domain selection instruction, supplied from a ROM which stores, in advance, a plurality of threshold values. With this arrangement, the video signal is first erased and a value which is the same as or smaller than the minimum value of the digital video signal quantized in the A/D converter 6 is supplied as the threshold value to the magnitude comparator of the gate circuit 8 from the above-mentioned ROM in correspondence with the domain to be recorded as a white image. Alternatively, a value which is the same as or larger than the maximum value of the digital video signal quantized may be supplied to the magnitude comparator of the gate circuit 8. Thus, the video signal supplied from the video signal output terminal 9 constantly corresponds to the white or black image regardless of the magnitude of the digital video signal.

Assume that the inner frame is set to be B5 size or A5 size which is smaller than A4 size. When an original of A4 size or B5 size is to be recorded on a recording medium of A3 size, a video signal corresponding to an image domain except for the domain of the original is converted to a video signal corresponding to a white image, and the domain except for the original may not be recorded as a black image.

The horizontal coordinate memory 28, the vertical coordinate memory 29, the domain code memory 30, and the hardware functions for driving them may be partially or entirely operated by the microcomputer in the sequence controller 20 in a software manner.

In the above embodiment, the domain selection operation is simultaneously performed with the driving operation of the original reader 1. However, a quantized video signal may be first stored in a memory and processed later on.

Further, in the block diagram of FIG. 2, the address bus 21 and the data bus 22 are directly connected to the bus lines of the microcomputer in the sequence controller 20. However, the address and data buses may be connected to the bus lines of the microcomputer through I/O ports.

In the above embodiment, the number of the inner frames for designating the domain is one. However, the number of the inner frames may be more than one. Further, time-division detection is performed by the comparators 33 and 43 in the above embodiment. However, each comparator and coordinate memory may be used for each address data, or a combination thereof may be utilized.

The counting operation of vertical addresses is performed by hardware. However, the counting operation may be performed by the microcomputer in the sequence controller in a software manner.

What we claim is:

1. An image reproduction device comprising:
   means for electrically reading an original image to generate a video signal;
   means for manually entering a plurality of coordinate data to designate a desired domain of the original;
   first storage means for storing said plurality of coordinate data entered via said entering means, said first storage means having a plurality of memory portions;
   means for controlling said first storage means so as to store each of said plurality of coordinate data entered via said entering means in an associated one of said memory portions;
   means for selecting an image within the domain designated by said entering means or an image outside of said domain;
   second storage means for storing selection status information of the image; and
   means for processing the video signal generated from said reading means such that, in accordance with the content of said first and second storage means, the video signal representing the image selected by said selecting means is converted into a specific signal, and the video signal representing the image which is not selected is derived as it is, without being converted into the specific signal.

2. A device according to claim 1, wherein said reading means is a one dimensional image sensor consisting of a plurality of photo-receiving elements.

3. A device according to claim 1, wherein said entering means has numeral input means for manually designating a desired domain.

4. A device according to claim 1, wherein said processing means converts the video signal associated with the image selected by said selecting means into the video signal corresponding to a white image.

5. A device according to claim 1, further comprising means for discriminating whether or not the video signal corresponds to the image within the domain designated by said entering means.

6. A device according to claim 1, wherein said processing means converts the video signal associated with the image selected by said selecting means into the video signal corresponding to a black image.

7. A device according to claim 1, further comprising means for forming the image based on the output from said processing means.

8. A device according to claim 1, wherein said entering means is adapted to enter coordinate data representing a plurality of apexes of a desired rectangular domain of the original.

9. A device according to claim 1, wherein said processing means includes gate means for gating the video signal generated from said reading means.

10. A device according to claim 1, wherein said control means selects the memory portion in which the coordinate data is to be stored.

11. A device according to claim 1, further comprising means for displaying the coordinate data entered via said entering means.

* * * * *

UNITED STATES PATENT AND TRADEMARK OFFICE
CERTIFICATE OF CORRECTION

PATENT NO. : 4,556,915

DATED : December 3, 1985

INVENTOR(S) : TAKEHIKO SHIBATA, ET AL.

It is certified that error appears in the above-identified patent and that said Letters Patent is hereby corrected as shown below:

Sheet 2 of 4, change "ADDRESS DECORDER" to --ADDRESS DECODER--.

Col. 2, line 54, change "correspoinding" to --corresponding--.

Col. 5, line 49, change "must sequentially" to --must be sequentially--.

Col. 6, line 55, change "nitide" to --nitride.--

Signed and Sealed this

Eighteenth Day of November, 1986

Attest:

DONALD J. QUIGG

Attesting Officer

Commissioner of Patents and Trademarks